United States Patent
Dunjic et al.

(10) Patent No.: US 11,915,227 B2
(45) Date of Patent: *Feb. 27, 2024

(54) VALUE TRANSFER CARD MANAGEMENT SYSTEM

(71) Applicant: The Toronto-Dominion Bank, Toronto (CA)

(72) Inventors: Milos Dunjic, Oakville (CA); David Samuel Tax, Toronto (CA); Kushank Rastogi, Toronto (CA); Derek Guan, Vaughan (CA); Zainab Eniola Bello, Toronto (CA)

(73) Assignee: The Toronto-Dominion Bank, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/890,315

(22) Filed: Aug. 18, 2022

(65) Prior Publication Data

US 2022/0405735 A1    Dec. 22, 2022

Related U.S. Application Data

(63) Continuation of application No. 17/005,787, filed on Aug. 28, 2020, now Pat. No. 11,468,430.

(51) Int. Cl.
*G06Q 20/34*    (2012.01)
*G06Q 20/38*    (2012.01)

(52) U.S. Cl.
CPC ..... *G06Q 20/3572* (2013.01); *G06Q 20/3433* (2013.01); *G06Q 20/381* (2013.01)

(58) Field of Classification Search
CPC ........... G06Q 20/3572; G06Q 20/3433; G06Q 20/381

(Continued)

(56) References Cited

U.S. PATENT DOCUMENTS 5,530,232 A    6/1996 Taylor
7,594,611 B1    9/2009 Arrington, III
(Continued)

FOREIGN PATENT DOCUMENTS

JP    200076547    3/2000
WO    WO-2015080725 A1 *  6/2015 ............. G06Q 20/10

OTHER PUBLICATIONS

Korczak, Alex; How to set up your PayPal to accept International currencies (PayPal interface); Webinterpret; https://support.webinterpret.com/hc/en-us/articles/203728826-How-to-set-up-your-PayPal-to-accept-International-currencies-PayPal-interface-; Jul. 28, 2020.

(Continued)

*Primary Examiner* — Sara C Hamilton
(74) *Attorney, Agent, or Firm* — Rowand LLP

(57) ABSTRACT

A processor-implemented method is disclosed. The method includes: configuring, by a processor, a value transfer card to be associated with a default currency account and one or more foreign currency accounts; receiving, by the processor, input including a selection of at least one of the one or more foreign currency accounts and a card control setting to be applied for the value transfer card in connection with the selected at least one foreign currency account; detecting, by the processor, a first transaction initiated using the value transfer card, wherein the detecting includes receiving a request to process the first transaction in a first currency associated with the selected at least one foreign currency account; determining, by the processor in real-time, that the first transaction results in violation of the card control setting for the value transfer card; and in response to determining that the first transaction results in violation of the card control setting for the value transfer card: querying, by the processor in real-time, an exchange rates database to obtain a current exchange rate between the first currency associated with the selected at least one foreign currency account and (Continued)

a second currency associated with a second one of the currency accounts; and processing the first transaction using the second currency account and the current exchange rate.

20 Claims, 9 Drawing Sheets

(58) Field of Classification Search
USPC ............................................................ 705/41
See application file for complete search history.

(56) References Cited

U.S. PATENT DOCUMENTS

| | | | |
|---|---|---|---|
| 7,860,789 | B2 | 12/2010 | Hirka et al. |
| 8,473,385 | B2 | 6/2013 | Chan et al. |
| 10,217,099 | B1 | 2/2019 | Cheatham |
| 2002/0174016 | A1* | 11/2002 | Cuervo ................... G07F 19/20 705/16 |
| 2010/0243730 | A1 | 9/2010 | Safahi |
| 2012/0091199 | A1 | 4/2012 | Talker |
| 2014/0279476 | A1 | 9/2014 | Hua |
| 2015/0178725 | A1 | 6/2015 | Poetsch |
| 2015/0302187 | A1 | 10/2015 | Verma et al. |
| 2015/0332246 | A1 | 11/2015 | Lafeer et al. |
| 2015/0356551 | A1 | 12/2015 | Dogin et al. |
| 2016/0148192 | A1* | 5/2016 | Storonsky ............ G06Q 20/381 705/17 |
| 2017/0323293 | A1 | 11/2017 | Strauss |
| 2017/0337548 | A1 | 11/2017 | Griggs et al. |
| 2018/0218352 | A1* | 8/2018 | Lafeer ................ G06Q 20/3572 |
| 2018/0374079 | A1 | 12/2018 | Hewitt et al. |
| 2019/0259098 | A1 | 8/2019 | Gurunathan |
| 2019/0272536 | A1 | 9/2019 | Kikuchi |
| 2019/0303907 | A1 | 10/2019 | Ni |
| 2020/0074449 | A1 | 3/2020 | Novis |
| 2020/0082406 | A1 | 3/2020 | Timko et al. |
| 2020/0090178 | A1 | 3/2020 | Vadhri et al. |
| 2020/0111084 | A1 | 4/2020 | Ward et al. |
| 2020/0167765 | A1 | 5/2020 | Singh |
| 2020/0210995 | A1 | 7/2020 | Cho et al. |
| 2020/0231269 | A1 | 7/2020 | Woubou |
| 2021/0117964 | A1 | 4/2021 | Mehd et al. |
| 2021/0174352 | A1 | 6/2021 | Kenney et al. |
| 2021/0201316 | A1 | 7/2021 | Lunceford et al. |

OTHER PUBLICATIONS

CIPO: CA Office Action relating to CA application No. 3,091,620, dated Aug. 23, 2023.

* cited by examiner

//VALUE TRANSFER CARD MANAGEMENT SYSTEM

CROSS-REFERENCE TO RELATED APPLICATION

The present application claims priority to U.S. patent application Ser. No. 17/005,787 entitled "Value Transfer Card Management System" filed on Aug. 28, 2020, the contents of which are incorporated herein by reference.

TECHNICAL FIELD

The present application relates to value transfer cards and, more particularly, to systems and methods for processing transactions that are initiated using value transfer cards.

BACKGROUND

Value transfer cards, such as credit cards, may be used by customers for various types of transactions. For example, a value transfer card may enable the cardholder to make purchases at a point-of-sale (e.g., a merchant terminal) or access automatic teller machines (ATMs) for account-related transactions (e.g., deposits, money transfers, cash withdrawals, etc.). Transactions using value transfer cards are typically processed by computing systems that perform backend services relating to authentication, account access and management, and data transfer. It is desirable to configure such computing systems to automatically detect and process a wide range of transactions that may be initiated using value transfer cards.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
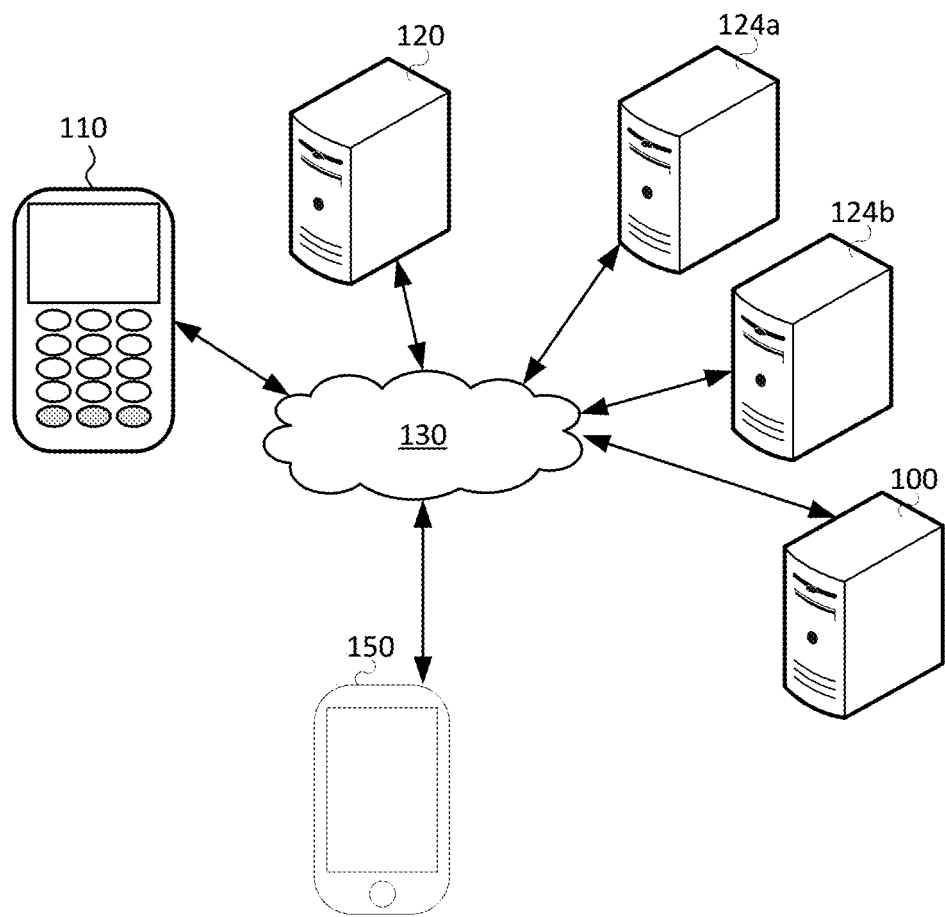
FIG. 1 is a schematic diagram illustrating an operating environment of an example embodiment.

In an aspect, the present application discloses a computing system. The computing system includes a processor and a memory coupled to the processor. The memory stores computer-executable instructions that, when executed by the processor, cause the processor to: configure a value transfer card to be associated with a default currency account and one or more foreign currency accounts; receive input including a selection of at least one of the one or more foreign currency accounts and a card control setting to be applied for the value transfer card in connection with the selected at least one foreign currency account; detect a first transaction initiated using the value transfer card, wherein the detecting includes receiving a request to process the first transaction in a first currency associated with the selected at least one foreign currency account; determine, in real-time, that the first transaction results in violation of the card control setting for the value transfer card; and in response to determining that the first transaction results in violation of the card control setting for the value transfer card: query, in real-time, an exchange rates database to obtain a current exchange rate between the first currency associated with the selected at least one foreign currency account and a second currency associated with a second one of the currency accounts; and process the first transaction using the second currency account and the current exchange rate.

In some implementations, the input may include a request message for requesting the card control setting to be applied to the selected at least one foreign currency account.

In some implementations, the card control setting may include a credit limit for the selected at least one foreign currency account, the credit limit identifying a maximum total amount of value transfers that is permitted from the selected at least one foreign currency account.

In some implementations, determining that the first transaction results in violation of the card control setting may include determining restrictions on transactions using the value transfer card that are associated with the selected at least one foreign currency account.

In some implementations, the input may indicate a selection of one or more permitted categories of transactions for the selected at least one foreign currency account, and determining that the first transaction results in violation of the card control setting may include determining whether a category of the first transaction is included in the selection of one or more categories.

In some implementations, the input may indicate a selection of one or more geographic regions for the selected at least one foreign currency account, and determining that the first transaction results in violation of the card control setting may include determining whether the first transaction is associated with a geographic region that is included in the selection of one or more geographic regions.

In some implementations, the input may indicate a selection of one or more types of value transfer channels for the selected at least one foreign currency account, and determining that the first transaction results in violation of the card control setting may include determining whether the first transaction is conducted via a value transfer channel that is included in the selection of one or more types of value transfer channels.

In some implementations, the input may indicate card-specific restrictions for the value transfer card, and the instructions, when executed, may cause the processor to enable the card control setting and the card-specific restrictions for the value transfer card.

In some implementations, the second currency account may comprise the default currency account.

In some implementations, the input may indicate one or more predefined rules for handling transactions that cannot be completed using the selected at least one foreign currency account.

In another aspect, the present application discloses a processor-implemented method. The method includes: configuring, by a processor, a value transfer card to be associated with a default currency account and one or more foreign currency accounts; receiving, by the processor, input including a selection of at least one of the one or more foreign currency accounts and a card control setting to be applied for the value transfer card in connection with the selected at least one foreign currency account; detecting, by the processor, a first transaction initiated using the value transfer card, wherein the detecting includes receiving a request to process the first transaction in a first currency associated with the selected at least one foreign currency account; determining, by the processor in real-time, that the first transaction results in violation of the card control setting for the value transfer card; and in response to determining that the first transaction results in violation of the card control setting for the value transfer card: querying, by the processor in real-time, an exchange rates database to obtain a current exchange rate between the first currency associated with the selected at least one foreign currency account and a second currency associated with a second one of the currency accounts; and processing the first transaction using the second currency account and the current exchange rate.

In another aspect, the present application discloses a non-transitory, computer-readable medium. The computer-readable medium stores computer-executable instructions that, when executed by a processor, cause the processor to: configure a value transfer card to be associated with a default currency account and one or more foreign currency accounts; receive input including a selection of at least one of the one or more foreign currency accounts and a card control setting to be applied for the value transfer card in connection with the selected at least one foreign currency account; detect a first transaction initiated using the value transfer card, wherein the detecting includes receiving a request to process the first transaction in a first currency associated with the selected at least one foreign currency account; determine, in real-time, that the first transaction results in violation of the card control setting for the value transfer card; and in response to determining that the first transaction results in violation of the card control setting for the value transfer card: query, in real-time, an exchange rates database to obtain a current exchange rate between the first currency associated with the selected at least one foreign currency account and a second currency associated with a second one of the currency accounts; and process the first transaction using the second currency account and the current exchange rate.

In another aspect, the present application discloses a computing device. The computing device includes a processor, a communications module coupled to the processor, and a memory coupled to the processor. The memory stores instructions that, when executed, configure the processor to: configure a value transfer card to be associated with a plurality of accounts, the plurality of accounts including a default currency account and one or more foreign currency accounts; receive input from an authorized entity associated with the plurality of accounts, the input indicating a selection of at least one of the foreign currency accounts and a card control setting to be applied for the value transfer card in connection with transactions associated with the selected at least one foreign currency account; and enable the card control setting for the value transfer card only in connection with the selected at least one foreign currency account.

In some implementations, the input may include a request message for requesting the card control setting to be applied to the selected at least one foreign currency account.

In some implementations, the card control setting may include a credit limit for the selected at least one foreign currency account, the credit limit identifying a maximum total amount of value transfers that is permitted from the selected at least one foreign currency account.

In some implementations, enabling the card control setting for the value transfer card may include restricting transactions using the value transfer card that are associated with the selected at least one foreign currency account based on the card control setting.

In some implementations, the input may indicate a selection of one or more categories of transactions, and enabling the card control setting may include enabling only those categories of transactions that are included in the selection for the selected at least one foreign currency account.

In some implementations, the input may indicate a selection of one or more geographic regions, and enabling the card control setting may include enabling only those transactions that are associated with geographic regions included in the selection for the selected at least one foreign currency account.

In some implementations, the input may indicate a selection of one or more types of value transfer channels, and enabling the card control setting may include enabling only those transactions that are conducted via a value transfer channel included in the selection for the selected at least one foreign currency account.

In some implementations, the input may indicate card-specific restrictions for the value transfer card, and the instructions, when executed, may configure the processor to enable the card control setting and the card-specific restrictions for the value transfer card.

In some implementations, the instructions, when executed, may configure the processor to: detect a transaction associated with the selected at least one foreign currency that is initiated using the value transfer card; determine that the transaction results in violation of the card control setting; and process the transaction using a first account that is different from the selected at least one foreign currency account and a current exchange rate associated with the first account.

In some implementations, the input may indicate one or more predefined rules for handling transactions that cannot be completed using the selected at least one foreign currency account.

In another aspect, the present application discloses a processor-implemented method. The method includes: configuring a value transfer card to be associated with a plurality of accounts, the plurality of accounts including a default currency account and one or more foreign currency accounts; receiving input from an authorized entity associated with the plurality of accounts, the input indicating a selection of at least one of the foreign currency accounts and a card control setting to be applied for the value transfer card in connection with transactions associated with the selected at least one foreign currency account; and enabling the card control setting for the value transfer card only in connection with the selected at least one foreign currency account.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the term "issuer account" refers to an account, such as a banking account, that is associated with a value transfer card. An issuer account may, for example, store resources that may be transferred in a transaction initiated using a value transfer card. Examples of an issuer account include, but are not limited to, a savings account, a credit account, a checking account, and a virtual payment account. An issuer account may be associated with a specific entity, such as an individual, a commercial entity, and the like. As will be explained in greater detail below, an issuer computing system, such as a server of a banking institution, that issues value transfer cards may manage issuer accounts belonging to a plurality of cardholders. For example, an issuer server may perform access control, account management, and transaction processing, among others, for a plurality of issuer accounts.

Example embodiments of the present application are not limited to any particular operating system, system architecture, mobile device architecture, server architecture, or computer programming language.

Value transfer cards, such as payment cards, can be used for making purchases at a point-of-sale or to access ATMs for account-related transactions. A value transfer card may be associated with an account that stores data and/or resources accessible to the cardholder. For example, a value transfer card may be associated with a primary account from which resources may be drawn for transfers. In particular, any transaction that is initiated using the value transfer card may access the resources of a single designated (e.g., default) account.

In certain contexts, configuring a value transfer card to be associated with a single account may be limiting. By way of example, a cardholder may designate an account that is denominated in a first currency (or "home" currency) as the primary account associated with a value transfer card. Transactions using the value transfer card, such as transfers or deposits of value, may default to the primary account. In particular, the transactions may be denominated in the first currency. When the cardholder engages in a foreign currency transaction (e.g., a purchase transaction in a foreign country) using the value transfer card, the transaction may be denominated in the first currency, with a current foreign exchange rate being applied to determine the effect of the transaction on the primary account. The cardholder often has no knowledge of the exchange rate until after the transaction is processed, which may reduce the desirability of engaging in foreign currency transactions.

More generally, a value transfer card that is associated with only a single account limits the control that the cardholder can exercise over transactions using the value transfer card. For example, the transactions may be constrained by the settings of the account (e.g., maximum limit on transfers), and the effects of the transactions on the account may be largely determined by parameters over which the cardholder has no control (e.g., interest rate, currency denomination, etc.).

The present disclosure describes systems and methods for configuring value transfer cards for multi-account support. More specifically, a computing system for configuring a value transfer card to be associated with multiple currency accounts is described. The disclosed computing system may, in at least some embodiments, be a computing system that is associated with an issuing entity of the value transfer card. The computing system allows an authorized entity to indicate selections of one or more foreign currency accounts of the cardholder and card control settings to be applied for the value transfer card in connection with transactions that are associated with the selected foreign currency accounts. The computing system enables the card control settings for the value transfer card only in connection with the selected foreign currency accounts. In accordance with disclosed embodiments, a single value transfer card may be used to access multiple currency accounts, and card controls may be selectively applied on a per-card and/or per-account basis.

The present disclosure also describes systems and methods for facilitating transactions using value transfer cards. Such transactions require processing operations, such as transaction request, authentication, and account data management, that are performed by backend computing systems associated with the transaction entities. The disclosed methods allow for handling of transaction requests by the computing systems. In accordance with disclosed embodiments, transactions that are initiated using value transfer cards are processed by automatically employing card controls, which may be selectively applied on a per-card and/or per-account basis. In particular, transactions using value transfer cards that can access multiple accounts can be processed by applying, in real-time, suitable card controls for the value transfer cards.

FIG. 1 is a schematic operation diagram illustrating an operating environment of an example embodiment.

As illustrated, a transfer rail server 120 communicates with remote computing devices via a network 130. The remote computing devices may take a variety of forms. For example, as illustrated, the transfer rail server 120 may communicate with one or more point-of-sale (POS) terminals 110 and/or one or more other computing devices such as, for example, one or more transfer initiation systems 124a, 124b. The transfer initiation systems 124a, 124b may be or include, for example, electronic commerce (i.e. e-commerce) systems. An e-commerce system may be, for example, a server associated with an electronic commerce website such as an online store that sells or facilitates the sale of goods and/or services online. The transfer initiation systems 124a, 124b may, additionally or alternatively, include one or more computer systems that are not e-commerce servers. For example, the transfer initiation systems 124a, 124b may be or include utility, subscription, or membership computing systems. For example, the transfer initiation systems may include computing devices associated with one or more of: telephone services, internet services, periodicals including magazines and newspapers, club memberships such as fitness memberships, utility services including, for example, water services, gas services, hydro services, etc.

The transfer rail server 120 may be a computing system that facilitates electronic funds transfer and may, in at least some embodiments, be referred to as a payment rail server. By way of example, the transfer rail server 120 may be a Visa™, Mastercard™, or American Express™ server. The transfer rail server 120 may be associated with a particular brand of value transfer cards. More particularly, the transfer rail server 120 may facilitate payment processing for a particular brand of value transfer card, such as a particular brand of credit and/or charge card. By way of example, in some embodiments, the transfer rail server 120 may only process Visa transactions. The transfer rail server 120 may also, in at least some embodiments, be referred to as a credit card network server.

The transfer rail server 120 communicates with a computing system, such as an issuer computing system 100. The issuer computing system 100 may be, for example, a computer system associated with a financial institution, such as a bank, that issued a credit and/or charge card. Put differently, the issuer computing system 100 is associated with a value transfer card issuer. For example, the issuer computing system 100 may be operated or managed by the value transfer card issuer.

A value transfer card may be or include a payment card (e.g., a credit card, a charge card, etc.). The value transfer card may have certain associated data. For example, the value transfer card may be associated with a primary account number (PAN), a verification number such as a credit card verification (CCV) number, and/or an expiry date. The value transfer card may be used by the point-of-sale terminal 110 or another transfer initiation system 124a, 124b for processing a transfer of value from a cardholder to an entity associated with such systems.

In order to process a transfer of value using the value transfer card, a POS terminal or other transfer initiation system 124a, 124b may communicate with the transfer rail server 120. For example, the transfer initiation system 124a, 124b may send, to the transfer rail server 120, a transfer request. The transfer request may specify, for example, an amount of value associated with the request. The transfer request may also include or be associated with one or more credentials associated with a value transfer card. The credentials may include, for example, the PAN, expiry date, and/or verification number for the value transfer card. Other metadata may also be included in the transfer request such as, for example, an entity identifier such as a merchant identifier, location information specifying a location at which the transfer initiation system 124a, 124b purports to be located, and/or other information.

The credential may take other forms. For example, the credential may include a token. A token may be a non-decryptable piece of data that is used to represent, by reference, value transfer card data. Tokens may be issued by a tokenization service, which may be included in the transfer rail server 120 or may be a separate system. The tokenization service and/or the transfer rail server 120 stores a mapping of a token to associated information such as, for example, value transfer card data. For example, the token may be mapped to one or more of an account number such as a PAN, a date (e.g., expiry date), verification data (e.g., CCV number), and/or a token holder. The token holder may identify an entity that the token was issued to and/or is associated with. The entity may, for example, be the transfer rail server 120. For example, the transfer rail server 120 may permit one or more third party systems (e.g., the transfer initiation system 124a, 124b) to obtain and store a token for a particular value transfer card. The token is a representation of the value transfer card and may be stored by the transfer initiation system 124a, 124b for future use in issuing value transfer requests. The token may be unique to the entity to which it is issued. That is, different entities that receive tokens for the same value transfer card may receive different tokens, and the transfer rail server 120 and/or the tokenization service may track which entity received which token so that an entity that issued a value transfer request that includes a token may be identified.

After the transfer rail server 120 receives a value transfer request, it may communicate with an issuer computing system 100 to request approval of the value transfer request. The request for approval may include, for example, information included in or obtained from the value transfer request, such as the amount of the value transfer request. The request for approval may include information determined based on the token. For example, the PAN may be included in the request. The transfer rail server 120 receives a response to the request for approval (e.g., either an indication of approval or an indication of denial) and sends a corresponding message to the transfer initiation system 124a, 124b.

Accordingly, a transfer initiation system 124a, 124b may use a credential associated with a value transfer card in order to initiate a transfer. In some instances, the transfer initiation system 124a, 124b may store the credential for future use. For example, the value transfer initiation system 124a, 124b may store a representation of a value transfer card in a memory associated with the value transfer initiation system 124a, 124b. The representation of the value transfer card may either be a "card-on-file" representation of the value transfer card or a tokenized representation of the value transfer card. In the card-on-file representation, the value transfer initiation system 124a, 124b stores the PAN, expiry date and, in some instances, the verification information associated with the value transfer card. In the tokenized representation, the value transfer initiation system 124a, 124b stores a token of the type referred to above.

As card holders use their value transfer card with various third-party entities, representations of the value transfer card may be stored at numerous locations. While two transfer initiation systems 124a, 124b are illustrated in FIG. 1, the number of transfer initiation systems 124a, 124b having a stored representation of the value transfer card may be much greater.

The issuer computing system 100 may communicate with a client device 150 via the network 130 in order to allow the client device 150 to be used in managing a value transfer card. More specifically, the issuer computing system 100 and the client device 150 may cooperate to provide a card management user interface on an output device, such as a display, of the client device 150. A user may interact with the card management user interface in order to input instructions to the client device 150. At least some such instructions may cause the client device 150 to send a management request or command to the issuer computing system 100.

The management request or command may take various forms. For example, in some instances, the management request or command may be an instruction to apply one or more card control settings to selected accounts. The card control settings for a value transfer card are controls (or restrictions) that are imposed on transactions which may be initiated using the value transfer card. The card controls may be applied in real-time on a per-account and/or per-card basis when processing transaction requests associated with the value transfer card.

Other management features and functions may also be provided by the management user interface.

The client device 150 may also include a stored representation of the value transfer card. For example, a token may be stored in secure memory of the client device 150 to allow the client device 150 to be used in initiating a transaction, such as a transfer of value. For example, the client device may include a near field communication (NFC) subsystem which may be used to send a token to the POS terminal 110 in order to initiate or complete a transaction.

The issuer computing system 100, client device 150, transfer initiation systems 124a, 124b, and the transfer rail server 120 may be in geographically disparate locations. Put differently, each of the issuer computing system 100, point-of-sale terminal 110, client device 150, transfer initiation systems 124a, 124b, and the transfer rail server 120 may be remote from others of the issuer computing system 100, client device 150, transfer initiation systems 124a, 124b, and the transfer rail server 120.

The issuer computing system 100, point-of-sale terminal 110, client device 150, transfer initiation systems 124a, 124b, and the transfer rail server 120 may each be both a computer system and a computing device.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, or the like. Additionally, or alternatively, the network 130 may be or may include one or more payment networks. The network 130 may, in some embodiments, include a plurality of distinct networks. For example, communications between certain of the computer systems may be over a private network whereas communications between other of the computer systems may be over a public network, such as the Internet.

Figure 2:
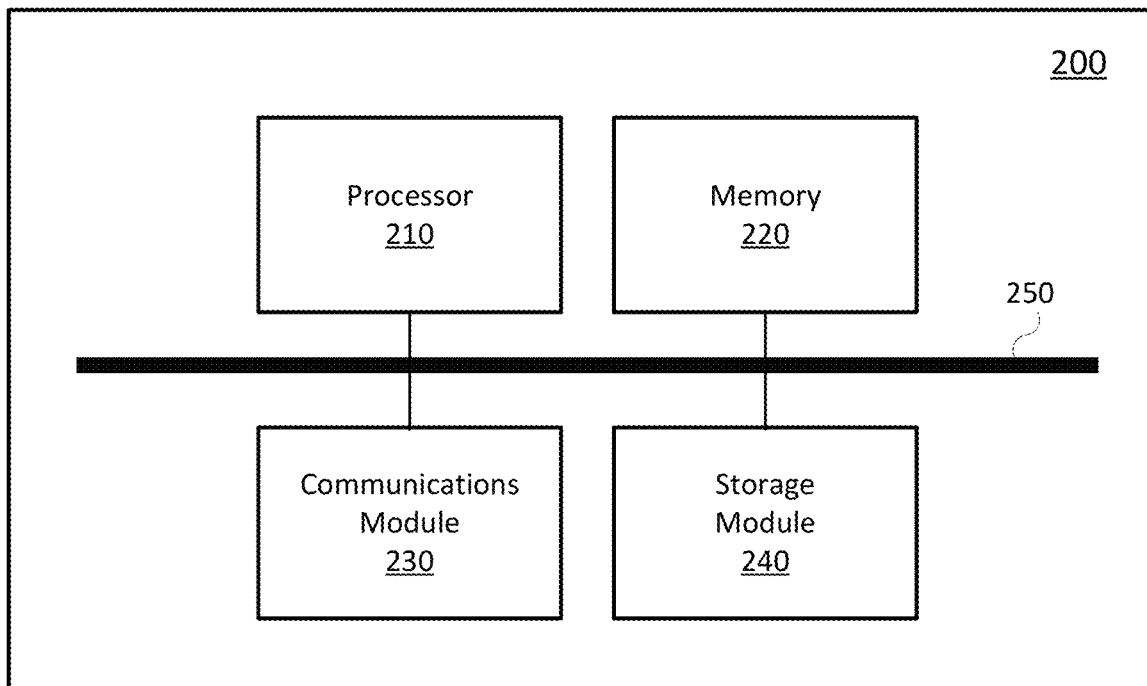
FIG. 2 is high-level schematic diagram of a computing device.

Referring now to FIG. 2, a high-level operation diagram of an example computing device 200 will now be described. The example computing device 200 may be exemplary of the issuer computing system 100, point-of-sale terminal 110, client device 150, transfer initiation systems 124a, 124b, and/or the transfer rail server 120.

The example computing device 200 includes numerous different modules. For example, as illustrated, the example computing device 200 may include a processor 210, a memory 220, a communications module 230, and/or a storage module 240. As illustrated, the foregoing example modules of the example computing device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 230 may allow the example computing device 200 to communicate using near-field communication (NFC), via WiFi™, using Bluetooth™, or via some combination of one or more networks or protocols. In some embodiments, all or a portion of the communications module 230 may be integrated into a component of the example computing device 200. For example, the communications module may be integrated into a communications chipset.

The storage module 240 allows the example computing device 200 to store and retrieve data. In some embodiments, the storage module 240 may be formed as a part of the memory 220 and/or may be used to access all or a portion of the memory 220. Additionally, or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally, or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely. The storage module may also be referred to as a data store.

Software comprising instructions is executed by the processor 210 from a computer-readable medium. For example, software may be loaded into random-access memory from persistent storage of the memory 220. Additionally, or alternatively, instructions may be executed by the processor 210 directly from read-only memory of the memory 220.

The computing device 200 will include other components apart from those illustrated in FIG. 2 and the specific component set may differ based on whether the computing device 200 is operating as the issuer computing system 100, point-of-sale terminal 110, client device 150, transfer initiation systems 124a, 124b, and the transfer rail server 120. For example, the computing device 200 may include one or more input modules, which may be in communication with the processor 210 (e.g., over the bus 250). The input modules may take various forms including, for example, a mouse, a microphone, a camera, a touchscreen overlay, a button, a sensor, etc. By way of further example, the computing devices 200 may include one or more output modules, which may be in communication with the processor 210 (e.g., over the bus 250). The output modules include one or more display modules which may be of various types including, for example, liquid crystal displays (LCD), light emitting diode displays (LED), cathode ray tube (CRT) displays, etc. By way of further example, the output modules may include a speaker.

Figure 3:
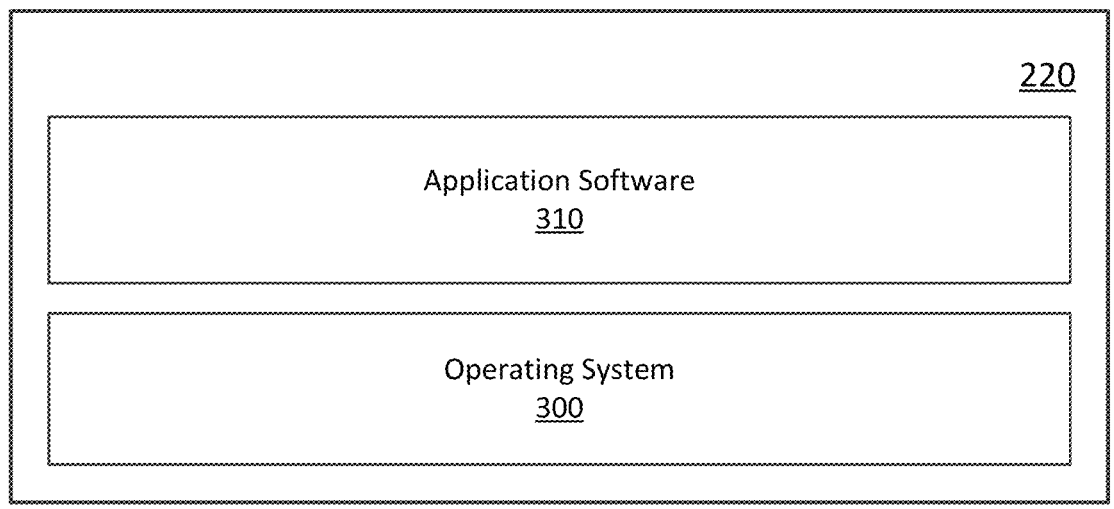
FIG. 3 shows a simplified organization of software components stored in a memory of the computing device of FIG. 2.

FIG. 3 depicts a simplified organization of software components stored in the memory 220 of the example computing device 200 (FIG. 2). As illustrated, these software components include an operating system 300 and an application software 310.

The operating system 300 is software. The operating system 300 allows the application software 310 to access the processor 210 (FIG. 2), the memory 220, and the communications module 230 of the example computing device 200 (FIG. 2). The operating system 300 may be, for example, Google™ Android™, Apple™ iOS™, UNIX™, Linux™, Microsoft™ Windows™, Apple OSX™ or the like.

The application software 310 adapts the example computing device 200, in combination with the operating system 300, to operate as a device performing a particular function. For example, the application software 310 may cooperate with the operating system 300 to adapt a suitable embodiment of the example computing device 200 to operate as the issuer computing system 100, point-of-sale terminal 110, client device 150, transfer initiation systems 124a, 124b, or the transfer rail server 120.

While a single application software 310 is illustrated in FIG. 3, in operation the memory 220 may include more than one application software 310 and different application software 310 may perform different operations.

Figure 4:
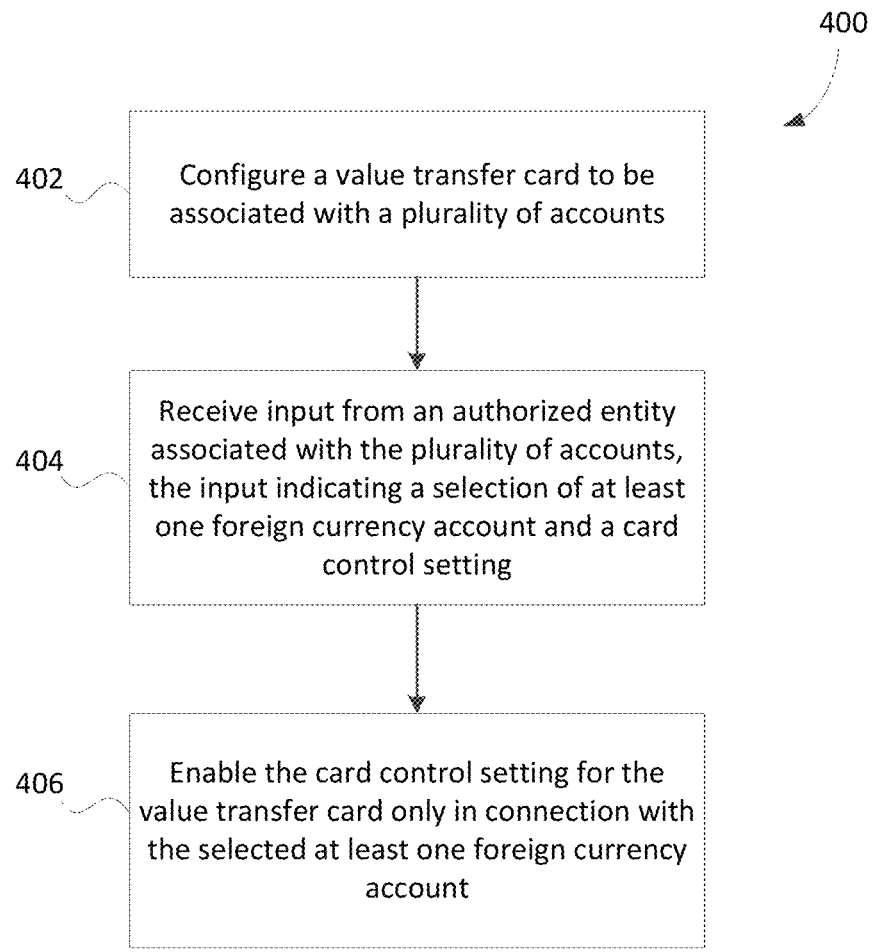
FIG. 4 shows, in flowchart form, an example method for configuring a value transfer card for multi-account support.

Reference is now made to FIG. 4, which shows, in flowchart form, an example method 400 for configuring a value transfer card for multi-account support. More particularly, the method 400 may be implemented to configure a value transfer card to be linked with multiple currency accounts and to manage use of the value transfer card in association with the multiple currency accounts.

Operations starting with operation 402 and continuing onward are performed by the processor 210 (FIG. 2) of a computing device 200 executing software comprising instructions such as may be stored in the memory 220 of the computing device 200. For example, the operations of the method 400 may be performed by the issuer computing system 100. More particularly, processor-executable instructions may, when executed, configure a processor 210 of the issuer computing system 100 to perform the method 400.

A value transfer card may be linked to multiple different currency accounts. In some embodiments, the accounts may be owned by a single entity, i.e. the cardholder. The cardholder may set up multiple banking accounts (for example, with a financial institution), with each account holding funds that are denominated in different currencies, including at least a default currency and one or more foreign currencies. In other embodiments, the currency accounts may be owned by multiple different entities. The cardholder may obtain authorization from the multiple owners to connect the value transfer card to the currency accounts and thereby gain access to the resources of the accounts. That is, a value transfer card may be used to access resources of accounts that are owned by different entities.

The cardholder (or another authorized entity) may use a card management user interface, which may be accessed via a client device, to connect a value transfer card with multiple currency accounts. The card management user interface may be provided to the client device by the issuer computing system. The issuer computing system may, for example, provide user interface data to the client device. The user interface data includes data for configuring the client device to display or otherwise output a user interface, which may be referred to as a card management user interface. As will be described in greater detail below with reference to FIGS. 8A-8C, a card management user interface may include selectable options to connect additional currency accounts with a value transfer card, and to indicate per-account card controls for one or more selected currency accounts.

In operation 402, the issuer computing system configures the value transfer card to be associated with multiple currency accounts. In particular, select ones of the currency accounts that are accessible to the cardholder are associated with the value transfer card, such that transactions using the value transfer card may access the resources of the selected currency accounts. As explained above, the currency accounts may be owned by a single entity or multiple different entities. In some embodiments, the issuer computing system may verify that the cardholder has authorization to access the resources of all of the accounts that are selected for connecting to the value transfer card. That is, before configuring the value transfer card to be associated with the selected accounts, the issuer computing system may perform a check to ensure that the cardholder has the requisite permissions for connecting the value transfer card to each of the selected accounts. In some cases, such verification may only be conducted if the cardholder is not the owner of all of the currency accounts that are selected for connecting to the value transfer card.

In operation 404, the issuer computing system receives input from an authorized entity associated with the multiple currency accounts. The authorized entity may, for example, be an account owner (or managing entity, etc.) for one or more of the currency accounts. In at least some embodiments, the issuer computing system may request authentication information in order to verify that the input is indeed received from an authorized entity associated with the currency accounts. For example, prior to accepting any input of operation 404, the issuer computing system may prompt for login credentials to verify the identity of the inputting entity. The prompt may be presented, for example, in the card management user interface. The input may be accepted upon successful authentication of the inputting entity.

The input indicates a selection of at least one of the foreign currency accounts and one or more card control settings to be applied for the value transfer card in connection with transactions that are associated with the selected foreign currency accounts. In particular, the input includes a definition of one or more card control settings for the selected accounts. In some embodiments, the input may be or include a request message for requesting the card control settings to be applied to the selected at least one foreign currency account. For example, the authorized entity may wish to impose certain card controls for the value transfer card in association with one or more of the currency accounts.

In some embodiments, the card control settings may include a credit limit for the selected foreign currency account. The credit limit may indicate a maximum total amount of value transfers that is permitted from the selected account. The credit limit may, in some cases, be indicated on a per-transaction or per-time period (e.g., daily limit, weekly limit, etc.) basis. Additionally, or alternatively, the card control settings may include a debit limit, indicating a limit on debit transactions using the value transfer card. Similar to the credit limit, the debit limit may, in some cases, be indicated on a per-transaction or per-time period basis.

In operation 406, the issuer computing system enables the selected card control settings for the value transfer card in connection with the selected at least one foreign currency account. In particular, the selected card control settings are enabled only for the corresponding foreign currency account identified in the input of operation 404. The selected card control settings are not enabled for any account other than the corresponding foreign currency account. In the case where the input indicates selection of multiple different foreign currency accounts and card control settings associated with the respective accounts, the issuer computing system may enable card control settings for all or a subset of the selected foreign currency accounts. For example, the issuer computing system may determine whether enabling the card control settings for all of the foreign currency accounts will result in an unexpected or undesired outcome, such as an account state for the selected currency accounts that is in violation of one or more predetermined rules or policies for currency accounts.

The issuer computing system may enable a card control setting for the value transfer card by restricting transactions using the value transfer card that are associated with a selected foreign currency account based on the card control setting. In other words, the issuer computing system is configured to enforce constraints on transactions using the value transfer card based on the card control settings. In at least some embodiments, the card control settings may be stored in a memory that is associated with the issuer computing system. When the issuer computing system receives a request to process a transaction using the value transfer card, the issuer computing system determines the account (e.g., foreign currency account) that is selected for the transaction. The issuer computing system retrieves the card control settings data for the selected account and enforces one or more of the constraints stipulated by the card control settings. For example, the issuer computing system may render a decision to approve or decline the transaction based on the card control settings, and communicate the decision to the other computing systems associated with transacting entities, such as the customer and merchant.

In some embodiments, the input of operation 404 may indicate a selection of one or more categories of transactions. For example, an authorized entity may select a foreign currency account and specify certain categories of transactions using the value transfer card that are permitted (or not permitted) for the selected account. The issuer computing system may enable card control settings for selected foreign currency accounts by enabling only those categories of transactions that are identified in the input of operation 404. That is, the issuer computing system may approve (or process, etc.) only the transactions for a selected foreign currency account that fall into the identified categories of transactions. For example, the input of operation 404 may indicate certain categories of transactions (e.g., ATM transactions, POS purchases, online transactions, etc.) that are approved for a particular foreign currency account linked to a value transfer card. The categories, or types, of transactions may be indicated at varying levels of granularity. For example, the input of operation 404 may indicate various transaction properties, such as merchant type, product or service category, etc. Transactions using the value transfer card that do not fall into any of the identified categories/types may be automatically declined, or otherwise handled differently.

In some embodiments, the input of operation 404 may indicate a selection of one or more geographic regions. For example, an authorized entity may select a foreign currency account and specify certain geographic regions in which transactions using the value transfer card are permitted (or not permitted) for the selected account. The issuer computing system may enable card control settings for the selected foreign currency accounts by enabling only those transactions that are associated with the geographic regions identified in the input of operation 404. In particular, use of a value transfer card for transactions may be restricted to certain geographic regions that are specified by the authorized entity.

In some embodiments, the input of operation 404 may indicate a selection of one or more types of value transfer channels. For example, an authorized entity may select a foreign currency account and specify certain channels of transactions (e.g., mobile wallets, card-on-file, card-present, etc.) that are permitted for the selected account. The issuer computing system may enable card control settings for the selected foreign currency accounts by enabling only those transactions that are conducted via one of the value transfer channels indicated in the input of operation 404.

Figure 5:
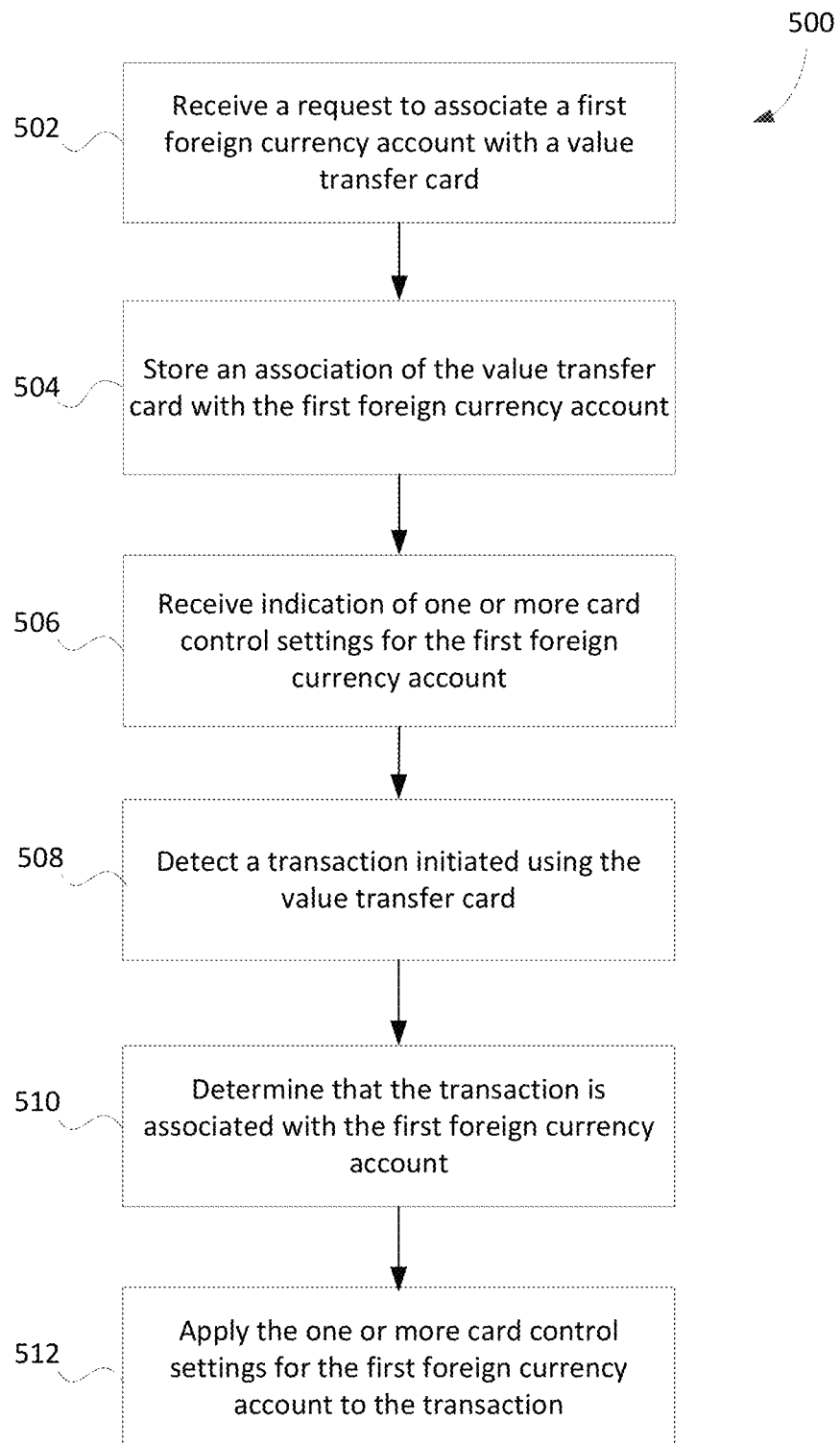
FIG. 5 shows, in flowchart form, an example method for processing a transaction that is initiated using a value transfer card.

Reference is now made to FIG. 5, which shows, in flowchart form, an example method 500 for facilitating a transaction that is initiated using a value transfer card. Operations starting with operation 502 and continuing onward are performed by the processor 210 (FIG. 2) of a computing device 200 executing software comprising instructions such as may be stored in the memory 220 of the computing device 200. For example, the operations of the method 500 may be performed by the issuer computing system 100. More particularly, processor-executable instructions may, when executed, configure a processor 210 of the issuer computing system 100 to perform the method 500. The operations of method 500 may be performed in addition to, or as alternatives, to one or more of the operations of method 400.

In operation 502, the issuer computing system receives a request to associate a first foreign currency account with a value transfer card. The request may be received via a client device associated with an authorized entity for the first foreign currency account (e.g., account owner, or managing entity), or an entity that is otherwise authorized to access the resources of the first foreign currency account. For example, if the cardholder obtains express authorization to access resources of the first foreign currency account, the cardholder may transmit, via their client device, a request for the issuer computing system to associate the first foreign currency account with the value transfer card. The request may, in some embodiments, be transmitted via user input in a card management user interface that can be displayed on the client device. For example, the request may include a selection of the first foreign currency account (or identifying information for the first foreign currency account, such as its PAN) and an instruction to add the account to a set of accounts that are already connected to the value transfer card.

In operation 504, the issuer computing system stores an association of the value transfer card with the first foreign currency account. In some embodiments, the issuer computing system may add the first foreign currency account to a stored list of accounts that are connected to the value transfer card. More generally, connected accounts data for the value transfer card may indicate the accounts that are linked to the value transfer card. The connected accounts data may be stored in a memory associated with the issuer computing system. The issuer computing system may thus add information (e.g., identifying information) for the first foreign currency account to the connected accounts data for the value transfer card. In this way, the first foreign currency account is designated as one of the accounts that can be accessed for transactions using the value transfer card.

In operation 506, the issuer computing system receives an indication of one or more card control settings for the first foreign currency account. The card control settings may be specified by an authorized entity associated with the first foreign currency account, such as the account owner or a manager entity. In some embodiments, an authorized entity may input the card control settings via a card management user interface on their client device. The card control settings may be similar to the settings that are described above with reference to method 400. For example, the card control settings may include credit limits, restrictions on types, geographic locations, and channels of transactions, etc.

In operation 508, the issuer computing system detects a transaction initiated using the value transfer card. The transaction may, for example, be an ATM transaction (e.g., cash withdrawal, check deposit, etc.) or a purchase at a POS. The issuer computing system determines, in operation 510, that the transaction is associated with the first foreign currency account. In at least some embodiments, the issuer computing system receives a request to process the transaction. The request may indicate, for example, an identifier of an account to be used for the transaction, credentials for authenticating to the account, and a transaction amount. Based on the account identifying information included in the request, the issuer computing system may determine that the transaction is to be processed using the first foreign currency account.

In operation 512, the issuer computing system applies the one or more card control settings for the first foreign currency account to the transaction. In particular, the issuer computing system may enforce card controls (e.g., restrictions) that are stipulated for the first foreign currency account. The transaction, which uses the first foreign currency account, may be constrained by the one or more card controls. By way of example, if the card control settings specify certain credit or debit limits for the first foreign currency account, the transaction may be constrained by such limits (e.g., the transaction amount cannot exceed the relevant credit/debit limits). By applying the card controls, the issuer computing system may determine whether the transaction using the value transfer card should be approved or declined (or otherwise handled differently).

Figure 6:
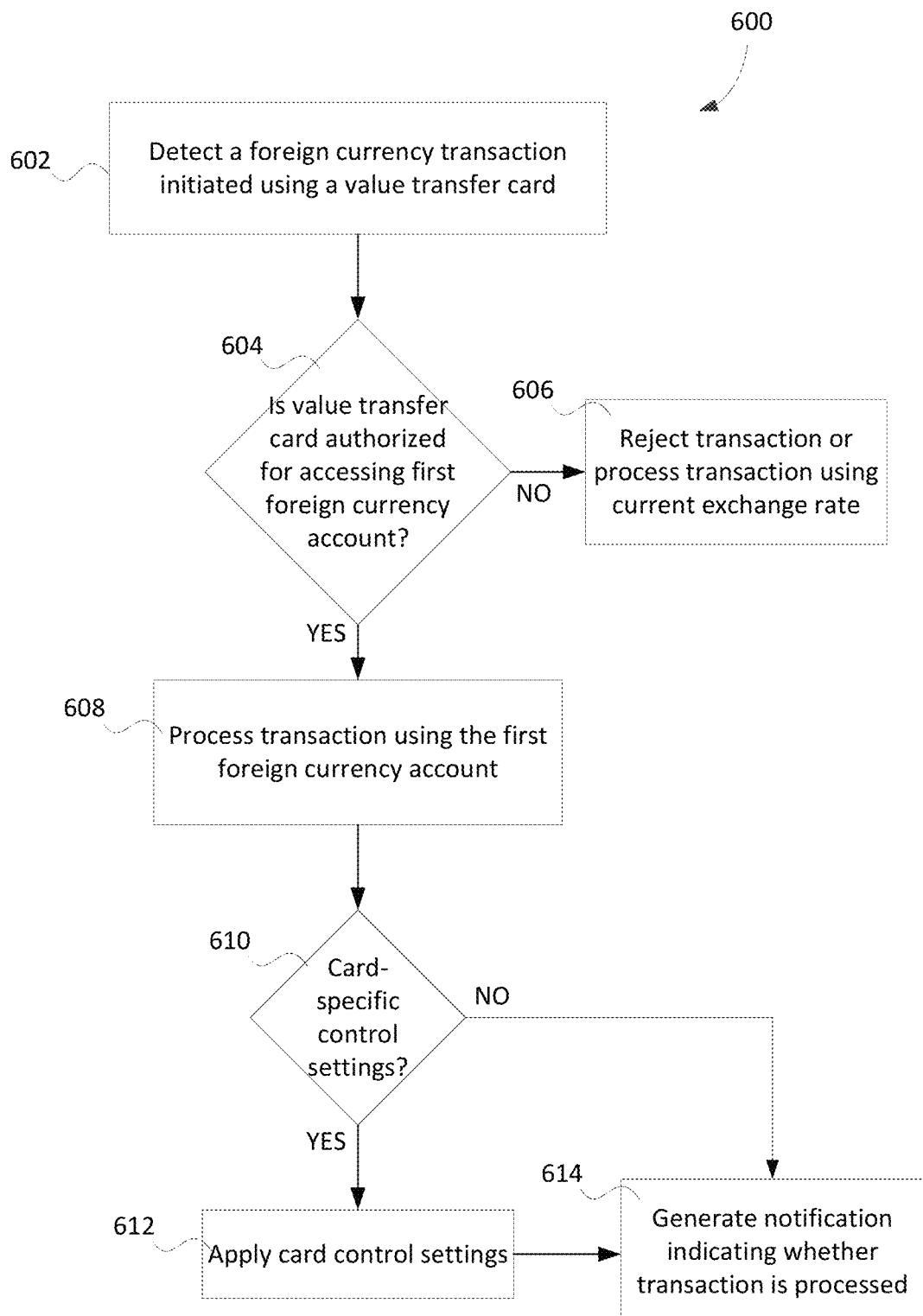
FIG. 6 shows, in flowchart form, another example method for processing a transaction that is initiated using a value transfer card.

Reference is now made to FIG. 6, which shows, in flowchart form, another example method 600 for facilitating a transaction that is initiated using a value transfer card. Operations starting with operation 602 and continuing onward are performed by the processor 210 (FIG. 2) of a computing device 200 executing software comprising instructions such as may be stored in the memory 220 of the computing device 200. For example, the operations of the method 600 may be performed by the issuer computing system 100. More particularly, processor-executable instructions may, when executed, configure a processor 210 of the issuer computing system 100 to perform the method 600. The operations of method 600 may be performed in addition to, or as alternatives, to one or more of the operations of methods 400 and 500.

In operation 602, the issuer computing system detects a foreign currency transaction initiated using a value transfer card. For example, the issuer computing system may receive a request to process a transaction in which a transaction amount is denominated in a foreign currency. The transaction may, for example, be a purchase at a merchant's POS. The request may be received from a transfer rail server associated with a value transfer card that is used for the transaction, or directly from an acquiring server associated with the merchant for the transaction. The issuer computing system may be requested to verify issuer account data for the transaction, and to render and provide an approval decision for the transaction.

In operation 604, the issuer computing system determines whether the value transfer card is authorized for accessing a first foreign currency account, where the first foreign currency account corresponds to the currency of the transaction. The issuer computing system may first check if the value transfer card is connected to the first foreign currency account. If the value transfer card is so connected, the issuer computing system verifies that the user of the card is authorized for accessing the first foreign currency account. For example, the issuer computing system may cause a prompt for authentication credentials to be presented to the card user, and perform the verification based on the inputted credentials.

If the value transfer card is not connected to the first foreign currency account or the card user is not authorized for accessing said account, the issuer computing system may reject the transaction or process the transaction using a current exchange rate, in operation 606. On the other hand, if the value transfer card is so authorized, the issuer computing system processes the transaction using the first foreign currency account, in operation 608.

In operation 610, the issuer computing system determines whether there are any card-specific control settings. In some embodiments, multiple value transfer cards may be associated with a single foreign currency account. For example, an entity (such as a business, etc.) may own a single foreign currency account and may provide company cards to multiple employees of the entity. The entity may specify certain card-specific control settings in addition to card control settings that are associated with the foreign currency account. That is, in addition to controls that are imposed generally on transactions that use a foreign currency account, card-specific controls may be defined.

The card-specific controls for one or more value transfer cards may be inputted by an authorized entity associated with the first foreign currency account. The authorized entity may be the account owner/manager or card distributing entity. For example, a company that distributes a limited number of company-funded payment cards may set the card-specific controls, so that the use of those payment cards can be managed. The card-specific controls may, for example, include fixed limits on how much funds in a given foreign currency account a particular card is permitted to access. In this way, the authorized entity associated with the foreign currency account can place restrictions on individuals' uses of the value transfer cards for transactions that access the account. The issuer computing system may store the defined card-specific controls in a memory; in particular, value transfer card data, including card-identifying information, may be stored in association with corresponding card-specific control settings in the memory.

If there are card-specific control settings for the value transfer card, the issuer computing system applies the card control settings, in operation 612. Otherwise, the issuer computing system generates a notification indicating whether the transaction is approved or declined. The notification can be transmitted to computing devices associated with the merchant and/or the card user, for example, via a payment rail server.

Figure 7:
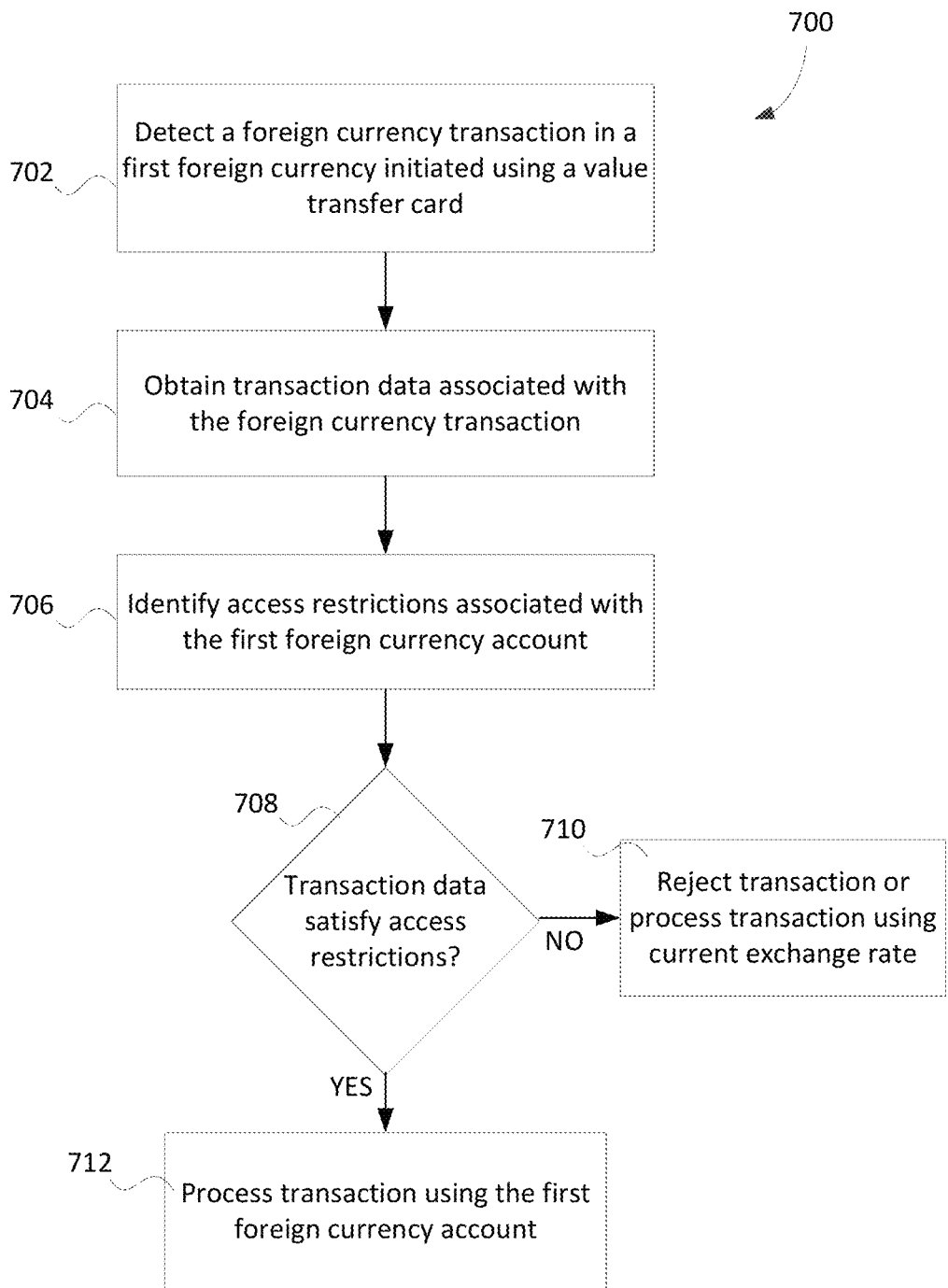
FIG. 7 shows, in flowchart form, another example method for processing a transaction that is initiated using a value transfer card.

Reference is now made to FIG. 7, which shows, in flowchart form, another example method 700 for facilitating a transaction that is initiated using a value transfer card. Operations starting with operation 702 and continuing onward are performed by the processor 210 (FIG. 2) of a computing device 200 executing software comprising instructions such as may be stored in the memory 220 of the computing device 200. For example, the operations of the method 700 may be performed by the issuer computing system 100. More particularly, processor-executable instructions may, when executed, configure a processor 210 of the issuer computing system 100 to perform the method 700. The operations of method 700 may be performed in addition to, or as alternatives, to one or more of the operations of methods 400, 500 and 600.

In operation 702, the issuer computing system detects a foreign currency transaction in a first foreign currency that is initiated using a value transfer card. As described above with reference to method 600, the issuer computing system may receive a transaction processing request to verify issuer account data, and to render and provide an approval decision for the transaction.

In operation 704, the issuer computing system obtains transaction data associated with the foreign currency transaction. In at least some embodiments, the transaction data is included in the transaction processing request received by the issuer computing system. The transaction data may indicate, for the transaction, information including, but not limited to: card identifier for the value transfer card, identifier for the issuer account, type of transaction, transaction amount, value transfer channel for the transaction, merchant/acquiring server associated with the merchant, and geographic location of the transaction.

In operation 706, the issuer computing system identifies access restrictions associated with the first foreign currency account. The access restrictions may include, for example, card control settings for transactions using the value transfer card that request to access the first foreign currency account. The access restrictions may also include card-specific controls that are specific to the value transfer card and its use in accessing the first foreign currency account.

The issuer computing system performs a check to determine whether each access restriction associated with the first foreign currency account is satisfied by the transaction and its properties (i.e., transaction data), in operation 708. If it is determined that the transaction data satisfy the access restrictions, the issuer computing system processes the transaction using the first foreign currency account, in operation 712. That is, the issuer computing system grants access to the first foreign currency account for the transaction using the value transfer card. In at least some embodiments, the issuer computing system generates a transaction approval message and transmits the message to the merchant and/or card user for the transaction. The message may be transmitted, for example, via a payment rail server that processes the transaction request.

Otherwise, if the transaction data do not satisfy the access restrictions (i.e. the transaction violates at least one of the access restrictions), the issuer computer system rejects the transaction or processes the transaction using a current exchange rate, in operation 710. If the transaction is rejected/declined, a message indicating the rejection decision may be transmitted to the merchant and/or card user, and processing of the transaction may be terminated. Alternatively, the transaction may be processed using a designated default account, such as a primary account belonging to the cardholder. The issuer computing system may obtain the current foreign exchange rate between the first foreign currency and the currency for the designated account, i.e. the currency in which the funds of the primary account are denominated. For example, the issuer computing system may query, in real-time, a database containing foreign exchange rate data to determine the relevant rate for the transaction. The transaction is processed using the current foreign exchange rate, and a transaction approval decision is rendered and provided to the merchant and/or cardholder.

More generally, an authorized entity for a foreign currency account may provide, to the issuer computing system, one or more predefined rules for handling transactions that cannot be completed using the foreign currency account. An account owner (or the like) of a foreign currency account may designate a default account for handling transactions that cannot be completed using the foreign currency account, and other associated rules for such transactions. For example, if the foreign currency account does not have sufficient funds for a requested transaction in that currency, rules may indicate how the transaction should be processed using a different (e.g., default) account. The authorized entity may also specify those of the access restrictions which must be satisfied in order for transactions to be permitted to use the foreign currency account, as well as those access restrictions which may be optional to check, for at least certain types of transactions.

Figure 8A:
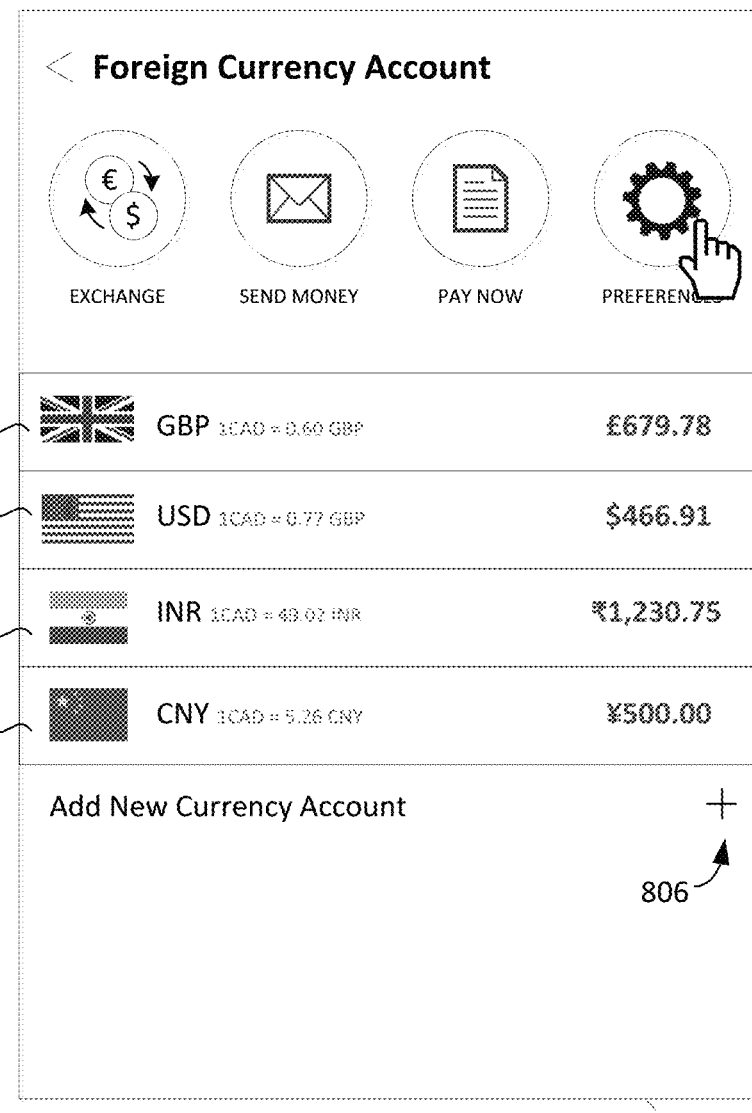
FIGS. 8A to 8C show display screens of an account management user interface.
Figure 8B:
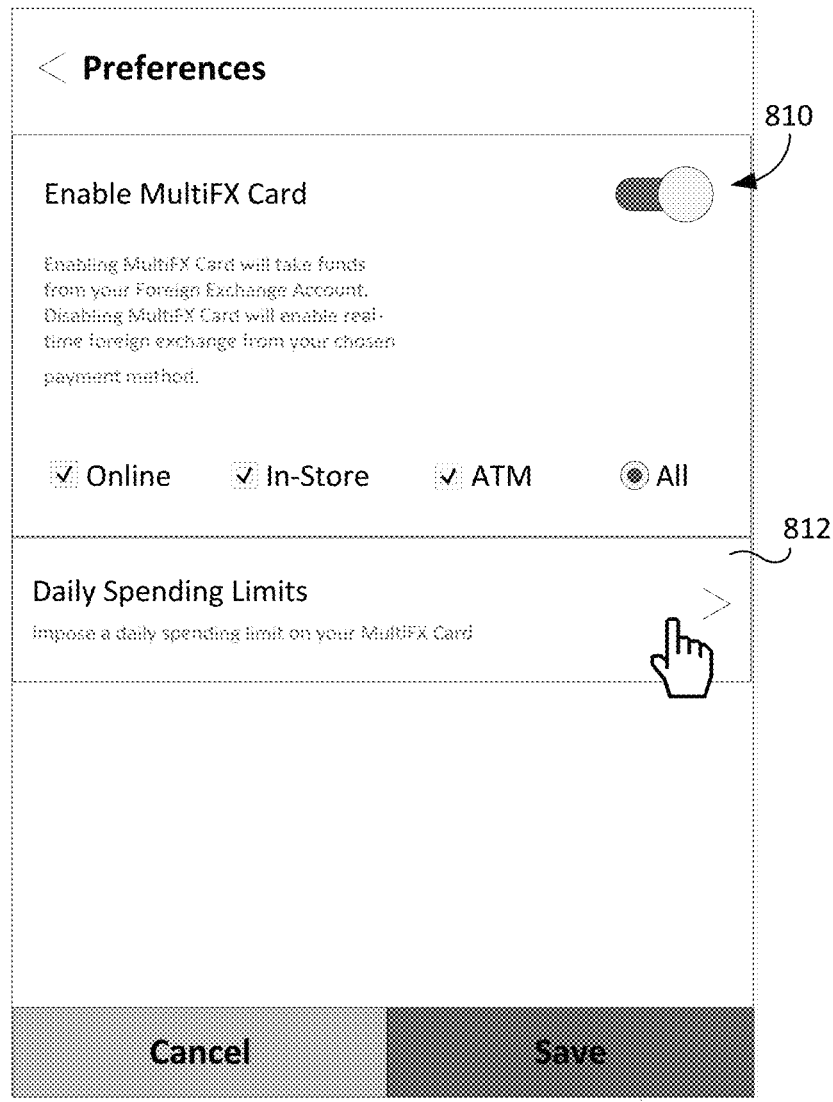
Figure 8C:
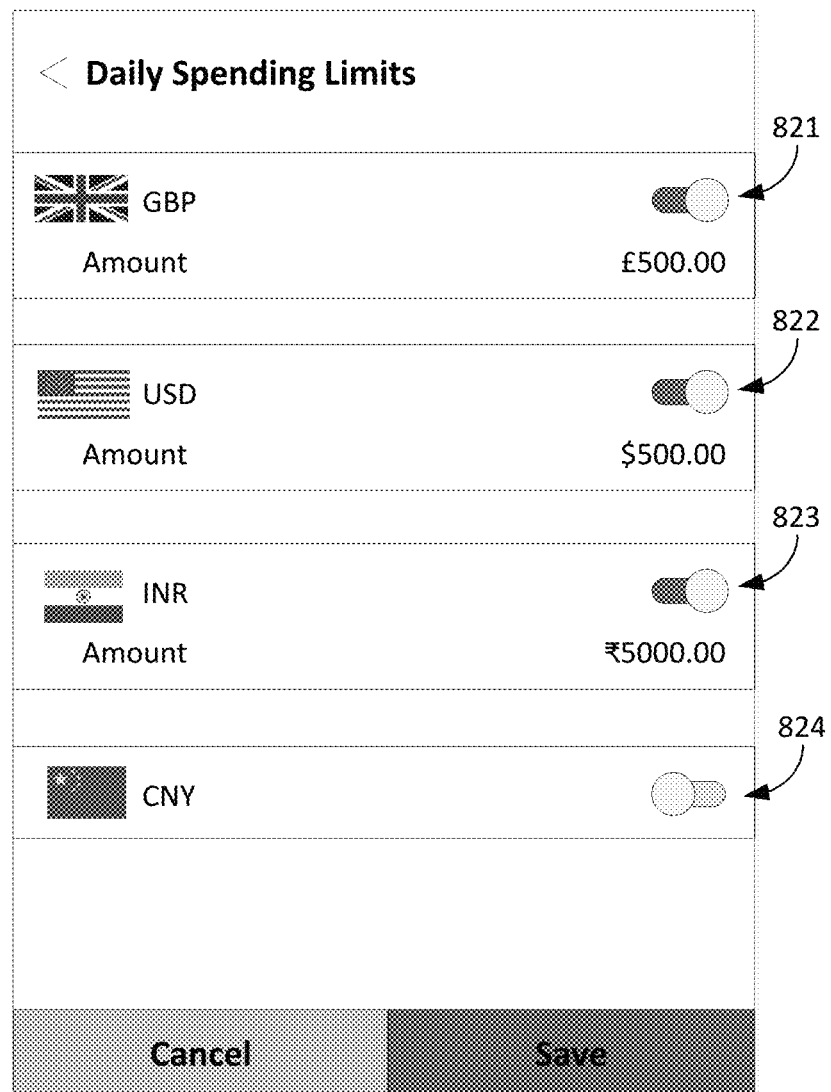

Reference is now made to FIGS. 8A to 8C, which illustrate example display screens 800a, 800b, and 800c, respectively, of a card management user interface. The card management user interface may be displayed on a client device 150 (FIG. 1).

As shown in screen 800A, the card management user interface may allow the user to add foreign currency accounts to the user's record (e.g., banking record). The foreign currency accounts each hold funds that are denominated in their respective currencies. Account details, such as a current balance and exchange rate, for each of the foreign currency accounts 801 to 804 can be displayed on a single display page. The screen 800A also provides a user interface element 806 for adding more currency accounts.

Selection of the "Preferences" item in screen 800B may lead to the screen 800B, which allows the user to enable or disable multi-card support for a particular value transfer card. The user interface element 810 can be toggled to enable or disable the multi-card support. The user may also be enabled to select the channels of transactions (e.g., "online", "in-store", "ATM") that are permitted to access the foreign currency accounts.

A further user interface element 812 leads to the screen 800C for defining card control settings. In the example of FIG. 8C, the card controls are in the form of spending limits (e.g., credit or debit limits) on the respective foreign currency accounts. The user interface elements 812-824 can be toggled independently to enable or disable the respective card controls.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

The invention claimed is:
1. A computing system, comprising:
a processor; and
a memory coupled to the processor, the memory storing computer-executable instructions that, when executed by the processor, cause the processor to:
configure a value transfer card to be associated with a default currency account and one or more foreign currency accounts;
receive input including a selection of at least one of the one or more foreign currency accounts and a card control setting to be applied for the value transfer card in connection with the selected at least one foreign currency account;

detect a first transaction initiated using the value transfer card at an automatic teller machine (ATM) or a point-of-sale (POS), wherein the detecting includes receiving a request to process the first transaction in a first currency associated with the selected at least one foreign currency account;

determine, in real-time, that the first transaction results in violation of the card control setting for the value transfer card; and in response to determining that the first transaction results in violation of the card control setting for the value transfer card:

query, in real-time, an exchange rates database to obtain a current exchange rate between the first currency and a second currency associated with a second one of the currency accounts; and process the first transaction using the second currency account and the current exchange rate.

2. The computing system of claim 1, wherein the input comprises a request message for requesting the card control setting to be applied to the selected at least one foreign currency account.

3. The computing system of claim 1, wherein the card control setting comprises a credit limit for the selected at least one foreign currency account, the credit limit identifying a maximum total amount of value transfers that is permitted from the selected at least one foreign currency account.

4. The computing system of claim 1, wherein determining that the first transaction results in violation of the card control setting comprises determining restrictions on transactions using the value transfer card that are associated with the selected at least one foreign currency account.

5. The computing system of claim 1, wherein the input indicates a selection of one or more permitted categories of transactions for the selected at least one foreign currency account, and wherein determining that the first transaction results in violation of the card control setting comprises determining whether a category of the first transaction is included in the selection of one or more permitted categories.

6. The computing system of claim 1, wherein the input indicates a selection of one or more geographic regions for the selected at least one foreign currency account, and wherein determining that the first transaction results in violation of the card control setting comprises determining whether the first transaction is associated with a geographic region that is included in the selection of one or more geographic regions.

7. The computing system of claim 1, wherein the input indicates a selection of one or more types of value transfer channels for the selected at least one foreign currency account, and wherein determining that the first transaction results in violation of the card control setting comprises determining whether the first transaction is conducted via a value transfer channel that is included in the selection of one or more types of value transfer channels.

8. The computing system of claim 1, wherein the input indicates card-specific restrictions for the value transfer card, and wherein the instructions, when executed, cause the processor to enable the card control setting and the card-specific restrictions for the value transfer card.

9. The computing system of claim 1, wherein the second currency account comprises the default currency account.

10. The computing system of claim 1, wherein the input indicates one or more predefined rules for handling transactions that cannot be completed using the selected at least one foreign currency account.

11. A processor-implemented method, comprising:

configuring, by a processor, a value transfer card to be associated with a default currency account and one or more foreign currency accounts;

receiving, by the processor, input including a selection of at least one of the one or more foreign currency accounts and a card control setting to be applied for the value transfer card in connection with the selected at least one foreign currency account;

detecting, by the processor, a first transaction initiated using the value transfer card at an automatic teller machine (ATM) or a point-of-sale (POS), wherein the detecting includes receiving a request to process the first transaction in a first currency associated with the selected at least one foreign currency account;

determining, by the processor in real-time, that the first transaction results in violation of the card control setting for the value transfer card; and in response to determining that the first transaction results in violation of the card control setting for the value transfer card:

querying, by the processor in real-time, an exchange rates database to obtain a current exchange rate between the first currency and a second currency associated with a second one of the currency accounts; and processing, by the processor, the first transaction using the second currency account and the current exchange rate.

12. The method of claim 11, wherein the input comprises a request message for requesting the card control setting to be applied to the selected at least one foreign currency account.

13. The method of claim 11, wherein the card control setting comprises a credit limit for the selected at least one foreign currency account, the credit limit identifying a maximum total amount of value transfers that is permitted from the selected at least one foreign currency account.

14. The method of claim 11, wherein determining that the first transaction results in violation of the card control setting comprises determining restrictions on transactions using the value transfer card that are associated with the selected at least one foreign currency account.

15. The method of claim 11, wherein the input indicates a selection of one or more permitted categories of transactions for the selected at least one foreign currency account, and wherein determining that the first transaction results in violation of the card control setting comprises determining whether a category of the first transaction is included in the selection of one or more permitted categories.

16. The method of claim 11, wherein the input indicates a selection of one or more geographic regions for the selected at least one foreign currency account, and wherein determining that the first transaction results in violation of the card control setting comprises determining whether the first transaction is associated with a geographic region that is included in the selection of one or more geographic regions.

17. The method of claim 11, wherein the input indicates a selection of one or more types of value transfer channels for the selected at least one foreign currency account, and wherein determining that the first transaction results in violation of the card control setting comprises determining whether the first transaction is conducted via a value transfer channel that is included in the selection of one or more types of value transfer channels.

18. The method of claim 11, wherein the input indicates card-specific restrictions for the value transfer card, and wherein the method further comprises enabling the card control setting and the card-specific restrictions for the value transfer card.

19. The method of claim 11, wherein the second currency account comprises the default currency account.

20. The method of claim 11, wherein the input indicates one or more predefined rules for handling transactions that cannot be completed using the selected at least one foreign currency account.

* * * * *